(12) United States Patent
Borm et al.

(10) Patent No.: US 12,412,915 B2
(45) Date of Patent: Sep. 9, 2025

(54) OPERATING METHOD FOR A SOLID OXIDE CELL SYSTEM

(71) Applicant: SUNFIRE GmbH, Dresden (DE)

(72) Inventors: Oliver Borm, Dresden (DE); Oliver Posdziech, Dresden (DE)

(73) Assignee: Sunfire GmbH, Dresden (DE)

( * ) Notice: Subject to any disclaimer, the term of this patent is extended or adjusted under 35 U.S.C. 154(b) by 0 days.

(21) Appl. No.: 17/920,469

(22) PCT Filed: Apr. 22, 2021

(86) PCT No.: PCT/EP2021/060523
§ 371 (c)(1),
(2) Date: Oct. 21, 2022

(87) PCT Pub. No.: WO2021/214214
PCT Pub. Date: Oct. 28, 2021

(65) Prior Publication Data
US 2023/0155150 A1 May 18, 2023

(30) Foreign Application Priority Data
Apr. 23, 2020 (EP) .................................. 20020194

(51) Int. Cl.
*H01M 8/0637* (2016.01)
*C01B 3/34* (2006.01)
(Continued)

(52) U.S. Cl.
CPC ............. *H01M 8/0637* (2013.01); *C01B 3/34* (2013.01); *C25B 15/08* (2013.01);
(Continued)

(58) Field of Classification Search
CPC ........... H01M 8/0637; H01M 8/04074; H01M 8/04589; H01M 8/04753; H01M 8/0625;
(Continued)

(56) References Cited

U.S. PATENT DOCUMENTS

| | | | | |
|---|---|---|---|---|
| 2005/0112425 | A1* | 5/2005 | Hsu | C01B 13/0251 429/495 |
| 2008/0060935 | A1* | 3/2008 | Hartvigsen | H01M 8/0656 204/242 |
| 2009/0235587 | A1 | 9/2009 | Hawkes et al. | |
| 2018/0366759 | A1* | 12/2018 | Brandon | H01M 8/1009 |
| 2020/0095124 | A1 | 3/2020 | Rueger | |

FOREIGN PATENT DOCUMENTS

| | | | | |
|---|---|---|---|---|
| EP | 1115908 | B1 | 6/2004 | |
| EP | 3054519 | A1 * | 8/2016 | ............... C25B 1/04 |

(Continued)

OTHER PUBLICATIONS

Machine Translation of JP-2010059514-A (May 10, 2023) (Year: 2023).*

Lorenzi, et al.; Digester Gas Upgrading to Synthetic Natural Gas in Solid Oxide Electrolysis Cells; ASC Publications; DO!: 10.1021/ef5023779, Energy Fuels 2015, 29, 1641-1653; Feb. 23, 2015.

(Continued)

*Primary Examiner* — Matthew J Merkling
(74) *Attorney, Agent, or Firm* — Barclay Damon LLP

(57) ABSTRACT

A method of operating a solid oxide cell system comprises generating an electrochemical conversion from one of: (i) water steam $H_2O(g)$; and (ii) a mixture comprising water steam $H_2O(g)$ and carbon dioxide $CO_2$. A quantity of at least one other substance is added into the one of the water steam $H_2O(g)$ and the mixture comprising water steam $H_2O(g)$ and carbon dioxide $CO_2$. The at least one other substance comprises a hydrocarbon $C_mH_n$. The quantity of the at least one other substance is converted into a syngas $CO+H_2$. An endothermic reforming of the mixed-in hydrocarbons occurs by coupling-in waste heat from the electrochemical conversion. The additional quantity of the at least one substance is added compensate for effects of a degradation of the solid oxide cells of the solid oxide cell system. A total quantity of the hydrogen $H_2$ generated by the solid oxide cell system is kept constant.

6 Claims, 2 Drawing Sheets

(51) Int. Cl.
*C25B 1/04* (2021.01)
*C25B 15/08* (2006.01)
*H01M 8/04007* (2016.01)
*H01M 8/04537* (2016.01)
*H01M 8/04746* (2016.01)
*H01M 8/0612* (2016.01)
*H01M 8/12* (2016.01)

(52) U.S. Cl.
CPC ........... *H01M 8/04074* (2013.01); *H01M 8/04589* (2013.01); *H01M 8/04753* (2013.01); *H01M 8/0625* (2013.01); *C01B 2203/0233* (2013.01); *C01B 2203/0238* (2013.01); *C01B 2203/067* (2013.01); *C01B 2203/0838* (2013.01); *C01B 2203/1235* (2013.01); *C25B 1/04* (2013.01); *H01M 2008/1293* (2013.01)

(58) Field of Classification Search
CPC ............. H01M 2008/1293; C01B 3/34; C25B 15/08; C25B 1/04
See application file for complete search history.

(56) References Cited

FOREIGN PATENT DOCUMENTS

| EP | 3168330 B1 | 7/2019 | |
| JP | 2010059514 A * | 3/2010 | ........ C02F 1/46104 |
| WO | 2006/001863 A2 | 1/2006 | |
| WO | 2013/078142 A2 | 5/2013 | |
| WO | 2015/116964 A1 | 8/2015 | |
| WO | 2021/214214 A1 | 10/2021 | |

OTHER PUBLICATIONS

Zhang, et al.; Numerical Investigation of Solid Oxide Electrolysis Cells for Hydrogen Production Applied with Different Continuity Expressions; Energy Conversion Management 149 (2017) 646-659; Aug. 7, 2017.
PCT/EP2021/060523; International Search Report/Written Opinion; dated Jul. 19, 2021 (14 pages).
PCT/EP2021/060523; English translation of International Search Report/Written Opinion; dated Oct. 25, 2022 (6 pages).

* cited by examiner

OPERATING METHOD FOR A SOLID OXIDE CELL SYSTEM

CROSS REFERENCE TO RELATED INVENTION

This application is a national stage application pursuant to 35 U.S.C. § 371 of International Application No. PCT/EP2021/060523, filed on Apr. 22, 2021, which claims priority to, and benefit of, European Patent Application No. 20020194.5, filed Apr. 23, 2020, the entire contents of which are hereby incorporated by reference.

TECHNOLOGICAL FIELD

This disclosure is directed to an operating method for a solid oxide cell system, in which in an electrochemical conversion by means of electric current hydrogen H2 or syngas CO+H2 is generated from water steam $H2O(g)$ or a mixture comprising water steam $H2O(g)$ and carbon dioxide CO2. The disclosed operating method is suitable for use in Solid Oxide Electrolyzer Cell (SOEC) systems, as well as in reversible Solid Oxide Cells (rSOC) in electrolysis mode.

BACKGROUND

The conversion efficiency of such SOEC or rather rSOC is particularly high when the cells or rather cell stacks (stacks) of the solid oxide cell system are operated thermoneutral over their entire service life.

In this connection, the thermoneutral mode of the stack is described in that the heat production due to ohmic losses of the electrolyzer cells is in balance with the heat demand for splitting the water. One advantage of SOEC over low-temperature electrolyzer systems (PEM, alkaline) is that at high temperatures, the electric current demand for water splitting falls and the heat demand rises, so that the ohmic heat is directly usable. In thermoneutral mode, the temperature of the stack changes with the load point. In this context, the efficiency remains constantly high. If the current intensity is increased or the resistance of the cells increases due to a degradation, at some point a maximum temperature at which the cells can be continuously operated will be reached. A further increase of the current intensity or of the resistance causes the heat production in the stack to exceed the heat consumed by the endothermic water splitting. The stack must then be cooled to prevent overheating. Cooling is usually implemented by more strongly increasing the air flow on the side of the oxygen electrode. Additionally, the inlet temperature of the fed-in gases can be reduced. Furthermore, the operating voltage increases, and along with it, the electrical power to be supplied. In such an exothermic operating mode, disadvantageously the efficiency of the system falls depending on the extent of the exothermia, characterized by the rise in stack voltage and cooling air demand. Low-temperature electrolysis systems always work in exothermic mode and therefore possess an inherently lower efficiency.

Furthermore, it has been shown that the cooling of a stack in exothermic mode (heat production results in a critical temperature rise) by means of process air and process gas can only be implemented with great difficulty, since the changed temperature profile causes an increased resistance in the stack and therefore, a further increase in the resistance.

In long-term operation, a degradation of the stack and an increase of the electrical resistance associated with it, are unavoidable. The increased resistance of the stack results in a higher operating temperature. If the maximum operating temperature is exceeded, either the current intensity must be reduced, which results in reduction of hydrogen production output, or the stack must be cooled (exothermic mode), which results in a deterioration of the efficiency, and additionally such a cooling with air shows only low effectiveness.

In many industrial applications, however, a constant production rate of hydrogen gas or syngas is required. Moreover, it is desirable to be able to provide over the short-term an additional quantity of hydrogen for managing load peaks, as required. The object of this invention is the feeding-in of hydrocarbons in electrolysis mode, by which the stack is additionally cooled by the endothermic reforming reaction, on the one hand, and an increased quantity of hydrogen is generated as a component of a syngas, on the other hand, by which the total quantity of the produced hydrogen/syngas, also referred to as product gas, can be kept constant, and/or an overload of hydrogen or syngas can be achieved. Various operating methods are known from the prior art for operating SOEC or rSOC systems.

Document WO 2006/001863 A2 describes an rSOC system that can be operated in the operating modes fuel cell or electrolysis, depending on electricity and gas prices. In fuel cell mode, a larger quantity of hydrocarbon is additionally fed into the system, to exploit the waste heat arising due to the exothermia of the fuel cell operation for production of hydrogen. The endothermic reforming reaction necessary for this takes place either in a pre-reformer or directly on the hydrogen electrode of the stack. Various operating modes are described, which can be selected depending on the cost of electricity and of natural gas, as well as the expected production quantity of hydrogen. The document does not describe, however, how hydrocarbons can be used in electrolysis mode to balance out the degradation.

Document EP 1 115 908 B1 describes a natural gas-supported steam electrolyzer, in which the anode side (oxygen electrode) is operated with a reformate from a catalytic partial oxidation of natural gas. The objective of the arrangement is to reduce the costs of hydrogen production and simultaneously to increase the efficiency of electrolysis. Feeding-in a combustion gas to the oxygen electrode is regarded as not technically possible. It is not stated that a degradation of the stack could be balanced out thereby, wherein this is not derivable in an obvious way for one skilled in the art, either, since the document does not provide any suggestions in this direction.

A high-temperature electrolysis system is known from document EP 3 168 330 B1, which provides a constant hydrogen output with fluctuating energy input. A hydrogen storage medium serves this purpose. With regard to such an arrangement, the limited storage capacity, higher costs as well as a possible degradation of the store material are disadvantageous.

Document WO 2013/078142 A2 further describes a fuel cell system (Solid Oxide Fuel Cell, SOFC), which also produces hydrogen and carbon dioxide, in addition to electricity. A mixture comprising a hydrocarbon and steam is fed into an SOFC system for this purpose. The anode residual gas is mixed with hydrocarbon and fed to a pre-reformer, to manufacture a hydrogen-rich syngas therefrom.

To date, rSOC are used in the prior art to generate electricity (from H2 or hydrocarbons) in SOFC mode and/or hydrogen in SOEC mode by means of electrolysis. The stacks used in the prior art are subject to degradation. In this context, due to the degradation of the stacks, the efficiency of the electrolysis must be reduced (exothermic mode) or the hydrogen/syngas generation output must be reduced at constant efficiency (thermoneutral mode). The latter manner of operation is more attractive to the user, since the electricity costs play a significant role in the cost effectiveness. A gap in demand arises here, which in the prior art can only be remedied by an external hydrogen/syngas source.

A high-temperature electrolysis system was disclosed in WO 2015/116964 A1, which has at least one electrolytic fuel cell with anode and cathode separated from one another, and to which a reserve voltage is applied.

By Guido Lorenzi et al., "Digester Gas Upgrading to Synthetic Natural Gas in Solid Oxide Electrolysis Cells", Energy Fuels 2015, 29, 1641-1652, XP 055514836 describes an SOEC system that is operated with fermentation gas.

Ji-Hao Zhang et al., "Numerical Investigation of Solid Oxide Electrolysis Cells for Hydrogen Production Applied with Different Continuity Expressions" in Energy Conversion and Management 149 (2017), 646-659, XP 085169710 also deals with the refinement of fermentation gases to synthetic natural gas (SNG).

Industrial processes that use hydrogen or syngas currently rely on fossil energy sources (usually natural gas). In this context, SMR (Steam Methane Reforming) is operated directly by the user or is set up as a central H2 production at a supplier of technical gases. SMR plants only possess an efficiency of approx. 70% relative to the natural gas used and the hydrocarbon as product, since heat is required for reforming the hydrocarbons. In the prior art, a burner is used for this purpose, by means of which the unused process gas is thermally converted. The use of fossil natural gas is associated with a corresponding quantity of CO2 emissions. Therefore, efforts are increasingly toward generating hydrogen and syngas from renewable electricity. If the hydrogen is fed into a natural gas pipeline or if there are other hydrogen/syngas generators in an industrial infrastructure, fluctuations in generation, or respectively a reduction of the hydrogen/syngas quantity does not play a large role. However, if the hydrogen is required locally for an industrial process that is not connected to any corresponding supply infrastructure, the produced hydrogen/syngas quantity must respectively correspond to the dimensioned quantity within the service life of the stacks. According to the prior art, the following measures are possible for this purpose:

The electrolysis system is over-dimensioned, to be able to provide the required hydrogen/syngas quantity even at the end of the service life of the electrolysis stack. This is associated with high investment costs, since the electrolysis system can only be operated at (a decreasing) partial load at the beginning and during the course of its operation. Alternatively, depending on the degradation-dependent product gas quantity, additional electrolysis modules can be added or degraded modules can be replaced. Additional investment costs as well as poor exploitation of the electrolyzer capacity are associated with this as well.

The electrolysis system is operated in exothermic mode as degradation increases. This is unfavorable, since the cooling effect of the exothermic mode is limited, the system must be dimensioned for both the low circulation air quantities in thermoneutral mode as well as for very high air quantities in exothermic mode, and the power electronics must be dimensioned for the higher operation voltages, which are higher in exothermic mode. Operation in exothermic mode is associated with higher operating costs, while the dimensioning for greater air quantities and operating voltages is associated with higher investment costs. Moreover, the cells are subject to a higher thermo-mechanical load at higher temperatures, by which cell breakage or failure of gas seals can occur more frequently.

An additional hydrogen source is connected, e.g. a low-cost low-temperature electrolysis system, an SMR system (Steam Methane Reforming), or logistical hydrogen is provided via trailer. All of these cases are associated with higher investment or operating costs, and with comparatively low efficiencies in the generation of the additional hydrogen.

The present invention is based on the object of providing an operating method for a solid oxide cell system that enables a solid oxide electrolysis cell system or rather a reversible solid cell system to be operated highly efficiently in electrolysis mode, and particularly to solve the economic and technical problems highlighted at the outset. Particularly, the partial object of keeping the hydrogen/syngas quantity constant despite degradation of the stack.

BRIEF SUMMARY OF THE INVENTION

An operating method for a solid oxide cell system in which in an electrochemical conversion by means of electric current hydrogen H2 and/or syngas CO+H2 is generated from water steam H2O(g) or a mixture comprising water steam H2O(g) and carbon dioxide CO2, is characterized in that an additional quantity of at least one of the substances from the group of natural gas, methane CH4 or another hydrocarbon CmHn is additionally added into the water steam H2O(g) or the mixture comprising water steam H2O(g) and carbon dioxide CO2 for conversion into syngas CO+H2, wherein an endothermic reforming of the mixed-in hydrocarbons occurs by coupling-in waste heat from the electrochemical conversion.

In the interest of clarity, it is noted that natural gas preferably has a methane proportion of 60 Vol- % -99 Vol- %, preferably 85-98 Vol- %, wherein other hydrocarbon compounds can also be contained therein. Within the meaning of the description of the present invention, the term "natural gas" is to be understood as a methane-rich gas or rather a gas of gas family 2. In this context, it is essential for the method according to the invention that the additionally provided gas can provide a large quantity of hydrogen during its reforming. Propane, butane, but also methanol, ethanol, or dimethyl ether are also suitable for the method.

Upon feeding-in hydrocarbons, a syngas (H2+CO) is generated in SOEC mode. In many applications, e.g. with the use of hydrocarbon for reducing iron in a blast furnace or a direct reduction plant, the syngas can be used without further gas processing. If high-purity hydrogen is required, however, CO and CO2 must be removed. Here, standard processes of a steam reforming plant are applied: In the first step, the CO is converted to CO2 via one or more shift stages. The heat arising in the shift reaction can be used for educt heating or steam generation within the system. The residual CO can be removed via a selective oxidation or selective methanation. Common methods such as membrane separation, pressure swing adsorption (PSA), temperature swing adsorption (TSA), amine scrubbing or cryogenic separation are used for separating the CO2. Novel compression methods for increasing the pressure of the hydrocarbon, e.g. an electrochemical compression or compression by means of metal hydride stores, can also simultaneously be used for gas purification.

The endothermic reforming of the mixed-in hydrocarbons can occur both internally as well as externally with regard to the stacks of the solid oxide cell systems, wherein an internal reforming can occur parallel to the electrochemical conversion in the cells, and an external reforming can occur by means of an additionally provided reformer. It is economically advantageous to be able to dispense with an external reformer, and the reforming occurs completely within the solid oxide cells of the solid oxide cell system, and an external reformer can be dispensed with.

The use of a reformer or rather the internal reforming in the cells can result in an enhancement of the overall efficiency, when otherwise excess heat due to the ohmic losses of the electrochemical conversion, which can only be used to a limited extent, would have to be led out of the system.

An embodiment of a solid oxide cell system can be particularly equipped or respectively operated with a reforming module or rather an internal reforming (or both), to generate a constant quantity of the hydrogen-rich gas. For this purpose, particularly fossil natural gas, natural gas from renewable sources, e.g. synthetic natural gas (SNG) or other suitable hydrocarbon compounds are fed into the system. The term "constant" refers here to the average over time of the total quantity of the hydrogen H2 or respectively syngas generated by the solid oxide cell system, relative to operation under rated load.

Waste heat arising in electrolysis operation can supply an endothermic steam reforming process of the hydrocarbons with heat, so that the conversion efficiency is very high.

According to the invention, an additional mixing-in of natural gas/methane CH4 and/or other hydrocarbons CmHn occurs for compensating the effects of a degradation of the cells. Since an additional quantity of hydrogen H2 is produced as part of the syngas (CO+H2) through the reforming, the additional feeding-in of a hydrocarbon as hydrogen source can advantageously provide an unchanging quantity of hydrogen over the lifetime of the system. In this context, the unchanging quantity of hydrogen is preferably relative to operation under rated load.

The mixing-in of natural gas, CH4 or (gaseous) CmHn occurs to keep constant over time a rate (standard cubic meters per second) of the H2 given off. If the SOC system is to provide hydrogen for a downstream chemical process, it is advantageous if this can occur in constant manner over time. An aging or degradation of the cells of the electrolyzer occurs by way of irreversible processes. As a result, the rate of H2 given off falls over time. The additional quantity of the at least one mixed-in substance has a predetermined mol relationship, for example 2 mol H2 to 1 mol hydrocarbon with CH4, so that larger quantities of H2 can be provided as needed by the mixing-in, to compensate for a decrease over time due to degradation of the hydrogen given off from the electrolytic decomposition of the water steam.

The relation of the generated hydrogen quantity to operation under rated load means that the electrolyzer is run at its dimensioned values and within the optimal process window (such as maximum volume flows, process temperature, etc.). Over time, the degradation would result in these values no longer being achieved. The overall quantity is therefore kept constant at a value that corresponds to the value at rated load.

Simultaneously or additionally, it is possible to economically use the excess waste heat from the electrochemical conversion process in the cell by feeding-in hydrocarbons and their endothermic reforming. Thus the cells can be operated at their thermoneutral point for longer over their overall service life, by which the cost effectiveness of the system increases. Preferably, the solid oxide cells of the solid oxide cell system can be cooled by the endothermic reforming, such that they can be operated thermoneutral over their entire service life.

In thermoneutral operation, the voltage sets itself to a characteristic value. The voltage only increases during exothermic operation, i.e. when removing heat from the stack. The voltage is therefore unsuitable as a control variable. The standard volumentric flows or respectively mass flows of the product gases are also not very suitable as control variables. In principle, a constant electrical power P for the stack can be set, and a control of the standard volumentric flows of the feed gases can be implemented in dependence upon the measured standard volumentric flows of H2 or respectively of the syngas into the products. Also, with co-electrolysis, the composition of the syngas at the stack outlet can be determined via the measured stack temperature. A measurement of the standard volumentric flow of the generated hydrogen can only be realized with great technical effort, since $H_2$ and $H_2O$ are present as a mixture of substances at the discharge of the stack. This becomes even more complex with co-electrolysis, since at least 4 components are contained in the product gas.

Preferably, the quantity of hydrogen produced and/or the quantity of syngas produced is determined using Faraday's Law relying on the measured current intensity, which is simultaneously suitable as a control variable. To keep the production rate of the generated hydrogen or respectively syngas constant, a target value for the H2 output or respectively syngas output is set by pre-setting a start value for the current intensity, and slowly increased, wherein the stack temperature is measured. When the current intensity cannot be increased further, due to the stack temperature having reached its target value for thermoneutral operation or a preset maximum value, an additional standard volumentric flow of a hydrocarbon CmHn is provided, so that a preset target value for the standard volumentric flow of the total produced hydrogen or respectively syngas is achieved. The standard volumentric flow of the total produced hydrogen or respectively syngas results from the sum of the standard volumentric flow of the electrolytically produced hydrogen, which is calculated according to Faraday's Law from the measured current intensity and the standard volumentric flow of the reformed hydrogen. For the control, look-up tables can be provided, from which the standard volumentric flow of the reformed hydrogen are provided by means of reforming rates and amount of substance ratios stored therein, from the standard volumentric flow of the one or rather more hydrocarbons fed-in.

Supplementarily or alternatively, with a known degradation behavior of the cells of the stack, a ramp can be provided for the standard volumentric flow of the one or more fed-in hydrocarbons. The degradation behavior can be determined statistically by measurement of current intensity, voltage, and stack temperature over time, and the ramp can be stored by means of an empirical function or a look-up table for the control.

Furthermore, additional feeding-in of natural gas/methane and/or other hydrocarbons CmHn with endothermic reforming can result in increasing the hydrogen output H2 and/or the syngas output CO+H2 of the system in thermoneutral operation, by which peak loads or rather short-term and/or short-notice extra demands of H2 or respectively syngas from downstream processes can be serviced. Furthermore, the product quantity can be increased to achieve an overload or rated load with less electricity, for example when a reduced quantity of renewable electricity can be provided from a renewable generator, such as a wind park or solar park, or it is more economical to feed-in hydrocarbons for a certain period of time due to the current electricity prices.

A short-term and short-notice increase of the production quantity of hydrogen is possible insofar as the current intensity and standard volumentric flows of the educts are simultaneously increased proportionally according to a preset feed-conversion rate, while monitoring the stack temperature. If the maximum stack temperature is reached, the current intensity is kept constant and hydrocarbon is dosed in. Simultaneously, the feed-in of H2O/CO2 is adjusted accordingly to keep the feed-conversion rate constant and maintain the desired quality of the syngas.

Keeping the production quantity of hydrogen constant when electricity availability is low is possible insofar as the current intensity and standard volumentric flows of the educts are simultaneously reduced proportionally according to a preset feed-conversion rate, and the current intensity is set to a value that can completely cover the electrical power consumed by the system from the supply of available renewable electricity. The stack temperature is monitored. If a minimum stack temperature is achieved, the current intensity is kept constant. Simultaneously, the feed-in of $H_2O$/ $CO_2$ is adjusted accordingly to keep the feed-conversion rate constant and maintain the desired quality of the syngas.

In electrolysis mode, high-temperature SOEC or rather rSOC are preferably operated in thermoneutral mode. In this context, the heat that arises in the stack due to ohmic losses, and the heat proportion that can be coupled-in for splitting water steam and/or CO2 in the electrolysis, are in balance. Since the ohmic losses or rather the resistance of the stack depend greatly on the current density and the temperature of the stack, the temperature of the stack also changes in thermoneutral operation according to current density. If, despite degradation, an unchanging quantity of hydrogen/ syngas is to be generated, or a larger quantity thereof is to be generated over the short-term and at short-notice, according to the invention natural gas or other hydrocarbons are fed into the cells, in addition to water steam or a mixture comprising water steam and carbon dioxide. An endothermic steam reforming therefore takes places in the cells, which consumes heat. As a result, the temperature of the cell is reduced, on the one hand, and a larger quantity of hydrogen is generated, on the other. E.g. up to four mol of hydrogen result from one mol of methane (the main component of natural gas). Thus the temperature of the stack can be controlled by feeding-in the hydrocarbons and the steam reforming associated therewith. This is especially important for compensating for the degradation of the stack. The degradation increases the resistance of the stack and therefore the ohmic losses. The maximum stack temperature would therefore already be reached without the method according to the invention at a lower current density, which would go along with a reduction in the maximum quantity of hydrogen or respectively syngas that can be generated. By feeding-in the hydrocarbons and the absorption of waste heat from the stack associated with the endothermic reforming, the stack temperature can be reduced while the quantity of hydrogen/syngas produced can be increased. A balancing of the degradation is possible thereby.

By feeding-in hydrocarbons and the endothermic steam reforming associated with it, the stack can be operated thermoneutral at a higher current density, on the one hand, and more hydrogen/syngas overall is generated, on the other. The method used for compensating for the degradation is therefore also suitable for providing in an efficient manner, over the short-term and at short-notice, a larger quantity of additional hydrocarbon/syngas, or to provide an unchanging quantity of hydrogen/syngas with a reduced consumption of electrical power. A higher or constant output of hydrogen/ syngas can occur here supplementarily by relying on the variability of the stack temperature and therefore of the resistance of the stack, even at low current input.

In another embodiment, to increase the hydrogen output and/or the syngas output CO+H2 of the system, additional heat can be fed in from external sources, as needed.

If high-temperature waste heat above the reforming temperature of approx. 500-700° C. is available from industrial processes (metallurgy, chemical industry), hydrocarbons can be fed into the system, and they can be converted into hydrogen/syngas by means of the endothermic steam reforming. For this purpose, the waste heat is preferably fed into an external reformer. The reforming can then occur predominantly within the external reformer or rather catalytic reactor, such that only the proportion of mixed-in hydrocarbons required for stabilizing the temperature at the thermoneutral operating point is endothermically converted in the cells. Aside from the exothermic reformer, a bypass supply can be provided, such that steam-reformed gas can be fed into the stack via the external reformer, and unreformed hydrocarbons can be fed in via a bypass.

In another variant, a reformer or rather catalytic reactor can be situated upstream of the stack for controlling the reformer temperature for setting the internal reforming in the stack by means of increasing or reducing the proportion of hydrocarbons, wherein heat from the waste heat of the stack or from external sources is fed to the reactor for increasing the conversion of the hydrocarbons.

Exemplary embodiments of the invention will be described in detail in the description below, with reference to the attached figures, wherein these are intended to explain the invention and are not to be considered limiting. Therefore, they are possible exemplary embodiments or respectively variants.

DETAILED DESCRIPTION OF THE INVENTION

Figure 1:
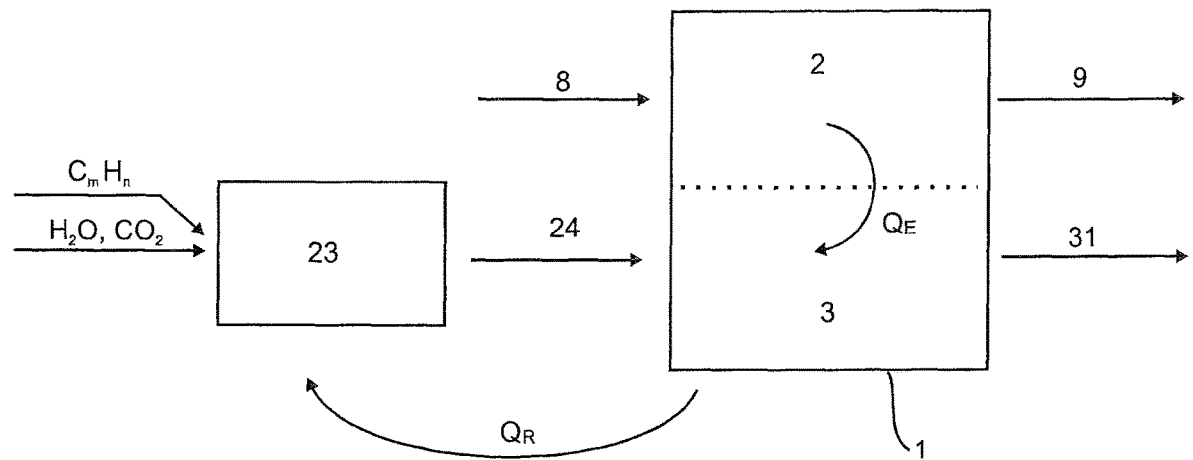
FIG. 1 schematically illustrates an embodiment of an operating method for a solid oxide cell system.

FIG. 1 shows the basic functional principle of the operating method for a solid oxide cell system according to the invention. The solid oxide cell system depicted as an example comprises a stack 1 of SOEC or respectively rSOC that can be operated in an electrolysis mode. With regard to the functional principle, the stack 1 can also be understood as a single cell or as a stack module. The stack 1 comprises an oxygen electrode 2 (anode) and a hydrogen electrode 3 (cathode). Air 8 is fed to the stack 1 as a flushing medium on the anode side, and a gaseous reformate of CH4, H2O, CO2, CO and H2 24 is fed to the stack 1 on the cathode side, and via the electrochemical reaction, preferably using renewable electricity, syngas (H2, CO) is generated as a product gas 31, while on the anode side flushing medium 9 enriched with oxygen O2 is released.

An additional quantity of hydrogen can be generated for balancing out a degradation of the cells or for covering an extra demand short-term or at short-notice, if hydrocarbons CmHn are fed to the solid oxide cell system. The hydrocarbons can be pre-reformed (only partially converted) or fully reformed in an external reformer 23, together with the water steam or respectively the mixture comprising water steam and carbon dioxide, which is provided in the conventional manner in high-temperature co-electrolysis. For this purpose, heat $Q_R$ can be coupled in from the stack 1. Alternatively or additionally, an internal reforming is possible in which the hydrocarbons, here preferably methane, are converted into $H_2$ and CO directly at the catalytically active hydrogen electrode. In this context, heat $Q_E$ is led away from the electrochemical conversion through the endothermic reforming. Alternatively, the work can be done without the external reformer 23. The educt gas together with the hydrocarbons $C_mH_n$ is led directly to the stack 1 and reformed in the cells of the stack 1.

The method depicted can always be applied when hydrogen/syngas is to be provided and waste heat due to the ohmic losses in the stack is available. This is the case when the stack is degraded and the ohmic resistance therefore increases.

The method can also be applied when the solid oxide cell system is connected to a synthesis, e.g. Fischer-Tropsch synthesis. Therein a hydrocarbon-rich residual/circulation gas arises, which is converted into H2 and CO in the external reformer 23 or directly in the stack, using heat from an exothermically operated electrolysis. By this heat decoupling, the electrolysis can be operated at a power density at which the stack would otherwise either overheat, or the system is cooled by air and this reduces the efficiency. The heat feed-in to the external reformer 23 can occur in various manners known in the prior art.

Figure 2A:
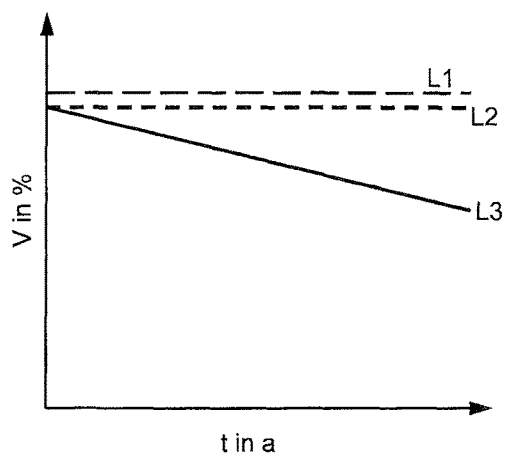
FIG. 2*a* graphically illustrates an embodiment of a curve of hydrogen output or of the efficiency over time t, for methods according to the prior art in which no compensation for the degradation occurs.
Figure 2B:
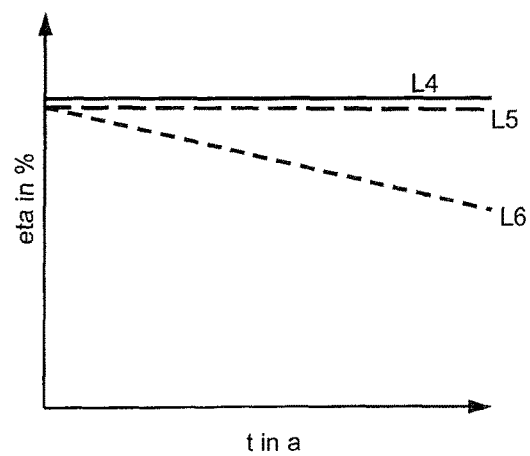
FIG. 2*b* graphically illustrates an embodiment of the operating method for a solid oxide cell system in which hydrocarbons CmHn are used to compensate for the degradation.

In FIG. 2a and FIG. 2b, the relative curve of the hydrogen output V or rather of the overall efficiency ETA over time for the method according to the prior art and the method according to the invention, wherein hydrocarbons CmHn are used to compensate the degradation are depicted. L2 and L6 depict the curve over time of the hydrogen output or rather of the efficiency for the method according to the prior art in which no compensation occurs for the degradation of the cells by mixing-in hydrocarbons. The SOEC system is operated increasingly exothermically over time, by which although a virtually constant output of hydrogen can be ensured, the efficiency falls with the increasingly exothermic process management. L3 and L4 depict the curve over time of the hydrogen output or rather of the efficiency for the method according to the prior art in which no compensation occurs for the degradation of the cells by mixing-in hydrocarbons. Although the SOEC system continues to be operated at its thermoneutral point, by which the efficiency can be kept constant over time, the quantity of the hydrogen donated falls over time, however, relative to the rated value of the hydrogen output. If hydrocarbons are then fed to the system for compensating the degradation, this has the effect that additional hydrogen (and additional syngas) is generated, on the one hand, and the stack is cooled by the endothermic reforming and therefore can be operated at its thermoneutral point, on the other hand. Thus both the H2 output as well as the efficiency can be kept constant in a very simple manner (cf. L1 and L5).

Figure 3:
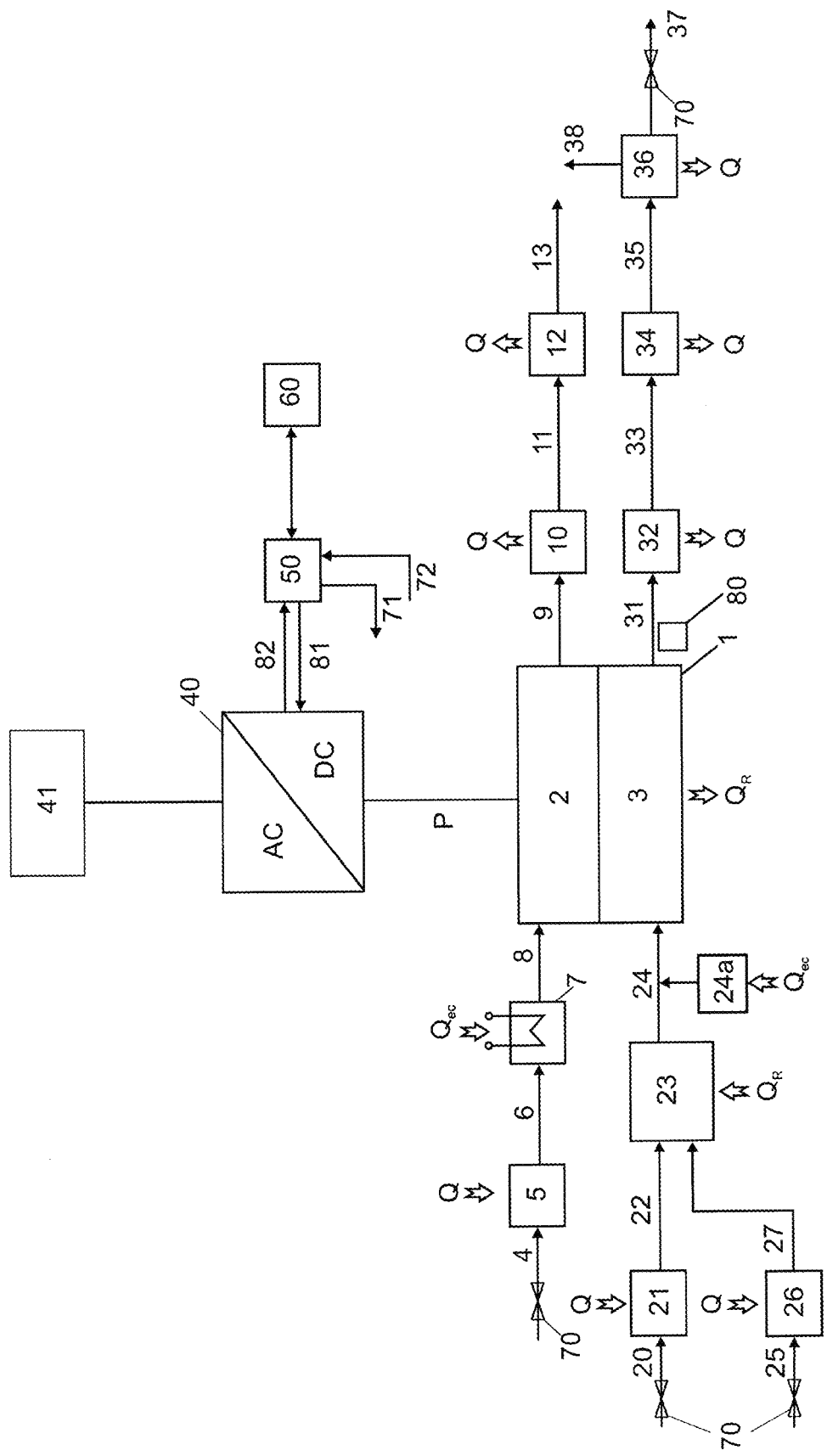
FIG. 3 schematically illustrates an of an SOEC system that is suitable for an embodiment of the disclosed operating method for a solid oxide cell system.

FIG. 3 shows a possible embodiment of an SOEC system that can be operated with the method according to the invention. It consists of an SOEC stack or stack module 1, which in turn comprises an oxygen electrode 2, a hydrogen electrode 3, and an oxygen-conducting electrolyte (not shown). Temperature-controlled air or another temperature-controlled flushing medium 8, such as nitrogen, CO2, water steam, or other gases that are inert with respect to oxygen are fed to the oxygen electrode 2 of the stack 1. The cold flushing medium 4 is first recuperatively heated by a heat exchanger 5. The preheated flushing medium 6 is additionally adjusted to the desired stack inlet temperature by means of an electric heater 7 before it is fed to the oxygen electrode 2. The oxygen-enriched flushing medium 9 leaving the stack via the oxygen electrode 2 is cooled by means of a heat exchanger 10, wherein the heat exchangers 5 and 10 preferably form one component. The cooled flushing medium 11 can be fed to an additional heat exchanger 12, to decouple usable heat again before it leaves the system as cold circulation medium 13.

Water or rather water steam 20 is fed to the system on the hydrogen electrode side. When fluid water is used, it is first transformed into the gaseous state in the evaporator 21. The evaporator 21 can be implemented as a heat store in which excess waste heat is stored, to generate steam with low energy expenditure. Other than heat/waste heat, the energy feed-in can also be electric. The water steam 22, with process gases 27, e. g. hydrocarbons $C_mH_n$, particularly methane $CH_4$, or return gases from a connected synthesis system (not shown), are fed to a catalytic reactor/reformer 23. In this context, the catalytic reactor/reformer 23 can be implemented such that heat from the stack module 1 can be coupled into it. In this context, the catalytic reactor/reformer 23 can be structured directly as a heat exchanger, or also implemented as a series circuit of at least one heat exchanger and reactor stage. The catalytic reactor/reformer 23 generates a reformate 24 from the process gases 27, said reformate 24 containing $CH_4$, $H_2O$, $CO_2$, CO and $H_2$. If necessary, the reformate 24 can be further heated by means of a recuperator 24a before it is fed to the hydrogen electrode 3. Alternatively or additionally, an electric heater (not shown) can also be used for this. Hydrocarbon $C_mH_n$, $CO_2$, water steam and/or return gas from a synthesis (hydrocarbons, CO, $CO_2$, $H_2$, $H_2O$) 25 is fed to the catalytic reactor 23 as a medium to be reformed. The educts 25 are heated in a recuperator or electric heater 26, and fed to the reactor 23 as overheated process gas 27. The reactor 23 is operated such that hydrocarbons can be reformed at a high rate with the external pre-reforming and the internal reforming in the SOEC stack 1, and the stack 1 can be effectively cooled. For this purpose, the reactor 23 can also be operated as a methanation reactor.

The reformate 24, which is fed to the hydrogen electrode 3, should only still contain methane (CH4) as a hydrocarbon, which is catalytically reformed very effectively by nickel in the SOEC stack before the educt is electrochemically converted. In this context, the internal reforming consumes heat from the ohmic losses of the electrochemical reaction. The product gas or rather residual gas 31 led away from the hydrogen electrode 3, said gas 31 containing H2, H2O, CO and CO2, is first cooled in a recuperator 32 to lead away heat. The recuperator 24a and the recuperator 32 can be implemented as a common unit.

The cooled residual gas 33 is further cooled in a shift stage 34. CO and H2O are converted into CO2+H2 in a hydrogen shift reaction in the shift stage 34. A CO fine-purification wherein the residual quantities of CO are converted occurs if desirable. The purified residual gas 35 is then cleaned up or rather conditioned. A purification stage 36 can serve for removing H2O and/or CO2, or other impurities. Pressure swing adsorption (PSA), temperature swing adsorption (TSA), amine scrubbing, membrane methods, and/or cryogenic separation methods can serve for purification. A simple condenser or the previously mentioned methods can be used to remove water or rather water steam. The purified hydrogen/the syngas 37 is then led out of the system, and can be fed to a downstream system, e.g. for Fischer-Tropsch synthesis. Normally the separated residual gases 38, such as e.g. H2O and CO2 are reused, e.g. to save water to be supplied or to increase the CO2 conversion. For this purpose, the CO2 in gaseous form is recirculated and fed to the educts 25. The standard volumetric flows of the fed-in process gases 4, 20, 25 can be monitored and adjusted by means of suitable actuators, e.g. mass flow controllers (MFC) 70. Equally the quantity of the standard volumetric flow of the purified hydrogen/of the syngas 37 can be monitored by means of a mass flow controller 70. These are only indicated as an example in FIG. 3, in the interest of clarity. At least one temperature sensor 80 is provided at the SOEC stack 1, to monitor the outlet temperature of the product gas 31 and therefore the operation of the stack 1 at the thermoneutral point, and to be able to adjust the operation of the stack. Alternatively, the sensor 80 can also be integrated into the stack 1 at a suitable location.

The SOEC stack 1 is supplied with electrical power P by means of an AC/DC converter 40. The AC/DC converter 40 is configured to consume power from an electrical supply grid 41, and to provide it as direct current, with a suitable voltage and current intensity, to the electrodes 2, 3 of the SOEC stack for the electrochemical reaction. Alternatively or supplementarily, a DC/DC converter (not shown) can be provided, to be able to feed direct current from a DC current source (photovoltaic system) and/or a battery store (also not shown, respectively) to the SOEC stack 1. The DC/DC converter can be structurally unified with the AC/DC converter 40. A depiction of individual phases of the electrical lines between assemblies 1, 40 and 41 is dispensed with in FIG. 3 in the interests of improved clarity.

In the method according to the invention a control apparatus 50 is provided for controlling the electrolysis process, and particularly the compensation of the degradation of the SOEC stack 1. The control apparatus 50 receives measurement signals 72 from the mass flow controllers 70, and provides signals for the control 71 of the electrolysis process to the mass flow controller 70. Measurement signals 72 can be the current standard volumetric flows of the individual process gases or rather gas mixtures, for example. The composition of the gases can also be monitored by means of suitable sensors. Furthermore the control apparatus 50 receives measurement signals 82 from the AC/DC converter 40, and provides signals thereto for the control 71 of the electrolysis process. Measurement signals 82 are the current stack voltage and the current intensity, for example. Alternatively to the current intensity, the current density, which can be calculated from the current intensity relative to the active area of the cells, can be used as a measurement signal as a variable derived from a measured variable. The control apparatus 50 also receives measurement signals 72 from the temperature sensor 80, particularly the temperature sensor provides measurement signals for the stack temperature as a measurement signal 72. Target values for the stack temperature and standard volumetric flows are provided in the control apparatus 50, and parameters and look-up tables required for the control are stored in said control apparatus 50. The control apparatus 50 is connected to a master control apparatus 60, and can receive therefrom target value specifications for the control of the electrolysis process, e.g. the currently required hydrogen quantity, and can provide information about the available hydrogen quantity and other status information. The control apparatus 60 can be part of a master SCADA system.

For exchanging measurement signals and control commands as well as further information, if needed, the control apparatus 50 is connected communicatively to the AC/DC converter 40, the master control apparatus 60, as well as the mass flow controllers 70 and the temperature sensor 80, via corresponding signal lines (not shown in the interest of clarity).

The control apparatus 50 can be selected as a programmable logic controller (PLC) or industrial computer, and comprises at least one processor that is configured to process information, including the information from the mass flow controllers 70 and the temperature sensor 80. The control apparatus 50 comprises a transitory memory and a non-transitory memory for storing and providing information. The method according to the invention can be held as software or firmware in the non-transitory memory. The control apparatus 50 can further comprise at least one input/output apparatus that can comprise any apparatus known in the prior art for providing input data 72, 82 for the control system 50 and/or providing output signals 71, 81 to the mass flow controllers 70 and the AC/DC converter 40. The embodiment of command sequences is not restricted to a certain combination of hardware circuits and software commands, regardless of whether they are described and/or depicted here. The control apparatus 50 can also contain at least one interface that enables the control apparatus 50 to communicate with the mass flow controllers 70, the temperature sensor 80, and the AC/DC converter 40. The sensor interface can be or contain e.g. one or more analog/digital converters that convert analog signals into digital signals that can be used by the processor. The sensor interface can also be configured to process information by means of various data transmission protocols.

LIST OF REFERENCE SIGNS
  1 SOEC stack/cell/stack module
  2 oxygen electrode
  3 hydrogen electrode
  4 flushing medium
  5 heat exchanger
  6 pre-warmed flushing medium
  7 electric heater
  8 air/flushing medium
  9 oxygen-enriched air/flushing medium
  10 heat exchanger
  11 cooled flushing medium
  12 heat exchanger
  13 cold flushing medium
  20 water steam/$H_2O$
  21 evaporator
  22 water steam/$H_2O$
  23 catalytic reactor/reformer
  24 reformate/educt gas
  24a recuperator/elec. heater
  25 $C_mH_n$, $CO_2$, CO, $H_2$, $H_2O$
  26 recuperator/electric heater
  27 overheated process gas
  31 residual gas
  32 recuperator
  33 cool residual gas
  34 shift stage
  35 purified residual gas 36 cleaning-up stage
37 purified hydrogen $H_2$/purified syngas $H_2$+CO
38 separated residual gases
40 AC/DC converter
41 electrical supply grid
50 control apparatus
60 master control apparatus
70 mass flow controller
80 temperature sensor
71, 81 control signals
72, 82 measurement signals
L1 curve over time of the hydrogen output according to the method according to the invention
L5 curve over time of the efficiency according to the method according to the invention
L2, L3 curve over time of the hydrogen output according to the prior art
L4, L6 curve over time of the efficiency according to the prior art
$Q_{ec}$ electric heat feed-in
Q thermal heat feed-in
$Q_R$ heat led away for the external reforming
$Q_E$ heat consumed in the internal reforming

The invention claimed is:

1. A method of operating a solid oxide cell system that is configured to produce at least one of: (i) carbon dioxide $CO_2$; (ii) hydrogen $H_2$; and (iii) synthesis gas CO+$H_2$ from an electrochemical conversion of one of: (i) water steam $H_2O$ (g); and (ii) a mixture comprising water steam $H_2O$ (g) and carbon dioxide $CO_2$, the method comprising:

admixing a quantity of at least one other substance into the one of: (i) the water steam $H_2O$ (g); and (ii) the mixture comprising water steam $H_2O$ (g) and carbon dioxide $CO_2$ for conversion into synthesis gas CO+$H_2$, wherein the at least one other substance is selected from the group consisting of natural gas, methane $CH_4$ or another hydrocarbon, wherein an endothermic reforming of the admixed hydrocarbons takes place by coupling in waste heat from the electrochemical conversion and the quantity of the at least one other substance in order to compensate for effects of a degradation of the solid oxide cells of the solid oxide cell system;

producing a quantity of hydrogen $H_2$;

determining at least one of: (i) a total quantity of hydrogen produced by the system; and (ii) a quantity of the synthesis gas produced by the system; and structuring a control device to, receive measurement signals from a mass flow controller, transmit signals from the control device to the mass flow controller to control an electrolysis process based on at least one of: (i) the determined total quantity of hydrogen produced by the system; and (ii) the determined quantity of synthesis gas CO+$H_2$ produced by the system; and regulating addition of the quantity of hydrogen $H_2$ to the system such that the total quantity of hydrogen $H_2$ generated by the solid oxide cell system is kept constant over a time with respect to an operation under a nominal load.

2. The method according to claim 1, further comprising providing a ramp configured for a standard volumetric flow of the at least one other substance.

3. The method according to claim 1, wherein the solid oxide cells of the solid oxide cell system are configured to be cooled by the endothermic reforming, such that they are configured to be operated thermoneutral over their entire service life.

4. The method according to claim 1, wherein an internal reforming of the at least one other substance occurs within the solid oxide cells of the solid oxide cell system.

5. The method according to claim 1, wherein an external reforming of the at least one substance occurs by means of a reformer arranged upstream of the solid oxide cell system, and wherein heat is led away from the solid oxide cell system to the reformer to cool the solid oxide cells of the solid oxide cell system.

6. The method according to claim 1, wherein at least one of: (i) the total quantity of hydrogen produced by the system; and (ii) the amount of synthesis gas, is determined via Faraday's law and a measured current strength.

* * * * *